Figure 1:
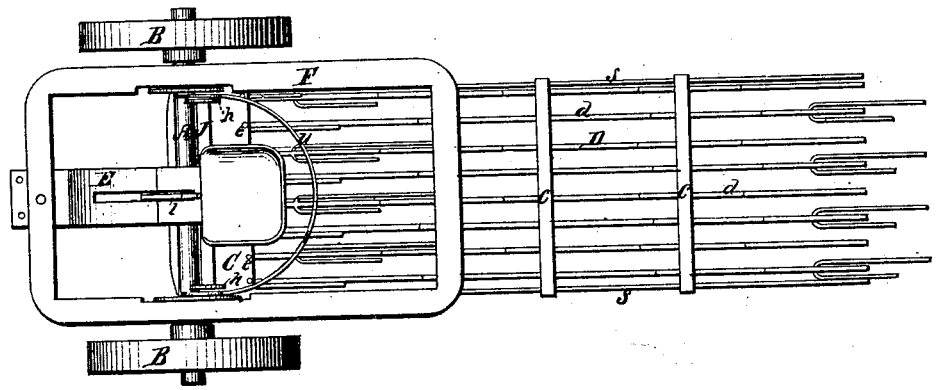
Figure 2:
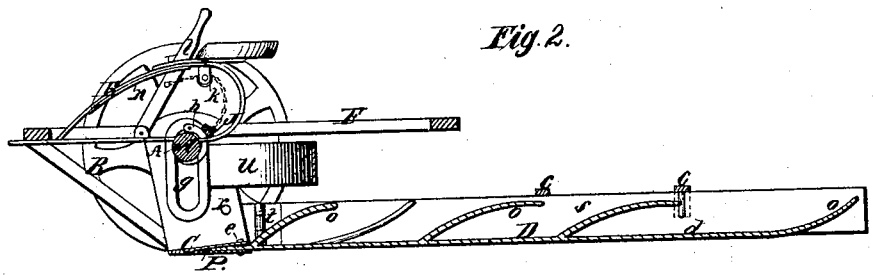

W. E. BABCOCK.
Potato-Digger.

No. 167,148. Patented Aug. 31, 1875.

Witnesses.
Lucius B. Parmele
Eugene S. Loomis.

Inventor.
William E Babcock

UNITED STATES PATENT OFFICE.

WILLIAM E. BABCOCK, OF EAST PEMBROKE, NEW YORK.

IMPROVEMENT IN POTATO-DIGGERS.

Specification forming part of Letters Patent No. 167,148, dated August 31, 1875; application filed May 10, 1875.

*To all whom it may concern:*

Be it known that I, WILLIAM E. BABCOCK, of East Pembroke, in the county of Genesee and State of New York, have invented a new and useful Improvement in Potato-Diggers, which improvement is fully set forth in the following specification, reference being had to the accompanying drawings.

My invention relates to an implement or machine to be used in digging and harvesting potatoes and other root-crops, in separating them from the earth, and leaving them upon the surface of the ground. It consists of two wheels connected by a shaft or axle. Upon the axle a frame is placed. Suspended from the axle and frame is a common flat share or excavator. Upon the axle and frame is attached a curved piece. Attached to each side of the excavator is a wide hinged piece, and between them is a series of rods with inclined projections. This I term the separator. The parts properly joined form the potato-digger.

A is the axle. B B are the wheels. C is the excavator. D is the separator. E is the curved piece, and F is the frame.

The machine consists of two wheels, B B, connected by the axle A. Upon the axle is placed the frame F, and suspended from the axle and frame is the flat share or excavator C, each end of which is bent upward at nearly right angles. Near the ends is a slot, through which the axle passes. Upon each side of the excavator is a brace extending from near the bottom to the front part of the frame. Upon the inside of the excavator, and at each slot, is placed an adjustable collar, *g*, fastened to the excavator with bolts, and which may be raised and lowered to regulate the depth the excavator may be desired to operate in the ground. Attached to the upper part of each collar is a clutch, *h*, fastened with a pin, which permits revolving motion of the clutches. The clutches *h h* are connected and operated by the bar J, from which a chain extends over the pulley *k* to the lever *l*. The clutches *h* serve to hold the excavator in position when in service. The lever *l* serves to connect and disconnect the clutches from the axle, and also to raise and lower the excavator, as may be desired. Upon the axle and frame is placed the curved piece E, to which is attached the driver's seat, the lever *l*, the pulley *k*, and the spring *n*. In the top of the curved piece E is a slot, through which the handle of the lever projects. On the under side, and near the slot, is placed the spring *n*, which has a catch extending under the slot, which serves to hold the lever in position when pushed forward. The spring *n* has a flange, upon which a slight pressure releases the lever when desired. At the rear side, and to the bottom of the excavator, is attached the piece P, between which and the excavator the rods *d*, hereinafter described, are inserted, and fastened with a pin, as shown at *e e*, which permits motion to the right or left by the team. The rods *d*, extending back from the excavator, as also the projections *o o*, attached to the same, may be of any desired size, length, and number, the rear ends of which are curved upward and inclined backward, as shown at *o o o*. The projections and elevations are adjusted on the rods *d*, so as to be forward of or in rear of those attached to the rods lying nearest to them, which permits them to pass through the earth more freely and without clogging. Attached to each side of the excavator by a bolt, *r*, is a wide hinged piece, *s s*, extending to the rear ends of the rods *d*, which serve to keep the earth and potatoes upon the rods *d* until the same pass out at the rear. The bolts *r r* allow a vertical motion to the sides *s s*, which also have hinged joints, as shown at *t t*, which permits motion to the right or left by the team. The sides are kept from spreading apart by bars *c c*, extending across the top and down the sides to near the ground. The bars *c c* are attached at one end to the opposite sides, which allows of forward and back motion to the sides. The sides *s s* may be in sections, and connected by bolts or otherwise, to conform to uneven surfaces of the ground. At the rear side of the excavator, and above the inclined projections, is attached a piece, *u*, circular in form, which I term the "leveler," which serves to prevent the earth from passing onto the rods *d* in uneven or too large quantities.

The operation is mainly as follows: The machine being placed in position for service, the lever *l* is released by pressing the spring *n* to one side, which permits the excavator to descend to the ground, and also causes the clutches to pass around and under the axle. The weight of the connecting-bar holds them firmly in position. The machine is then moved forward. The earth and potatoes pass over the excavator and fall upon the rods $d\ d$. The forward movement causes the upward and inclined projections to raise the potatoes to the surface of the ground, while the earth passes mainly between them. To raise the excavator, push the lever forward, which first releases the clutches from the axle, and then raises the excavator from the ground; and it is held there by the catch on the spring $n$.

I claim as my invention—

1. The combination of the adjustable collars $g\ g$, the clutches $h\ h$, the connecting-bar J, the pulley $k$, the lever $l$, the spring $n$, and the curved piece E, substantially as described, and for the purpose set forth.

2. The piece P, the pins $e\ e$, the rods $d\ d$, the inclined projections $o\ o\ o$, the sides $s\ s$, the bolts $r\ r$, the hinges $t\ t$, the cross-bars $c\ c$, and the leveler $u$, substantially as described, and for the purpose hereinbefore set forth.

WILLIAM E. BABCOCK.

Witnesses:
LUCIUS B. PARMELE,
EUGENE S. LOOMIS.